E. BANTZ.
Means for Creating Artificial Currents.
No. 6,086. Reissued Oct. 13, 1874.
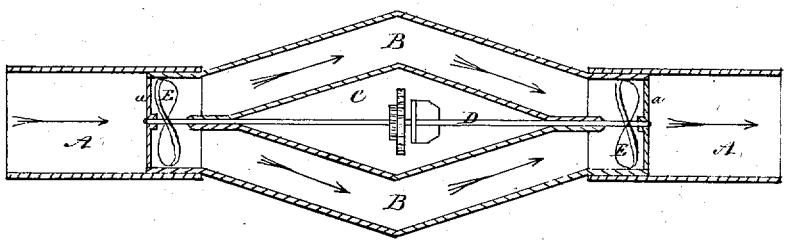
Witnesses.
T. C. Smith
Wm. E. Chaffee
Inventor.
Edward Bantz
per W. Morris Smith
Attorney.

UNITED STATES PATENT OFFICE.

EDWARD BANTZ, OF BALTIMORE, MARYLAND.

IMPROVEMENT IN MEANS FOR CREATING ARTIFICIAL CURRENTS.

Specification forming part of Letters Patent No. 139,854, dated June 17, 1873; reissue No. 6,086, dated October 13, 1874; application filed August 22, 1874.

*To all whom it may concern:*

Be it known that I, EDWARD BANTZ, of the city and county of Baltimore, in the State of Maryland, have invented improvements for the prevention of stagnation in water, or of foul air in mines or vaults, by creating artificial currents therein, of which the following is a specification:

This invention relates to the prevention of offensive odors arising from harbors, basins, sewers, and the like; also, to the ventilation of buildings; and it consists in a novel construction of means for producing artificial or forced currents therein, by which stagnation and local decomposition are prevented, or an artificial current of air is produced.

The annexed drawing represents the means for effecting the purpose of my invention, and represents a horizontal section of such apparatus.

A represents a tunnel, of any suitable dimensions, divided at any desired point into two or more branch tunnels, B, which may be substantially in the form shown, and then again connected with a continuation of the main tunnel. The branch tunnels or sewers B may each be half-segments of the main tunnel or sewer A, and have a space, C, between them. D represents a shaft, arranged lengthwise between the two branch tunnels, with its ends entering the main tunnel, where they are supported by one or more transverse bars, *a*. Upon each end of the shaft D is a screw or propeller-wheel, E, of a little less diameter than that of the main tunnel. This shaft D, with its wheels E, is to be rotated by any suitable and convenient means and motor.

This apparatus is designed for use wherever an artificial current is needed, as in harbors or basins, where the water, especially during the summer months, is liable to become stagnant and impure, and, by such means, a current may be created and maintained throughout such reservoir, harbor, or basin, connecting it with or directing it toward any stream or river, whereby the stagnation of the water is prevented, and the offensive odors arising therefrom are avoided.

A similar apparatus may be used for ventilation, either arranged to force fresh air, or to exhaust foul air, into or from any buildings.

The size of the tunnel must depend upon the volume of water or air desired to be passed through it in a given time.

Having thus fully described my invention, what I claim as new, and desire to secure by Letters Patent, is—

The spiral wheels E, one or more, and shaft D, in combination with the tunnel or sewer A, and its divided sections B B, for operation substantially as and for the purpose set forth.

EDWARD BANTZ.

Witnesses:
W. MORRIS SMITH,
WM. E. CHAFFEE.